March 31, 1964
R. W. COLLAR
3,127,148
VALVED COUPLING
Filed March 14, 1962
2 Sheets-Sheet 1
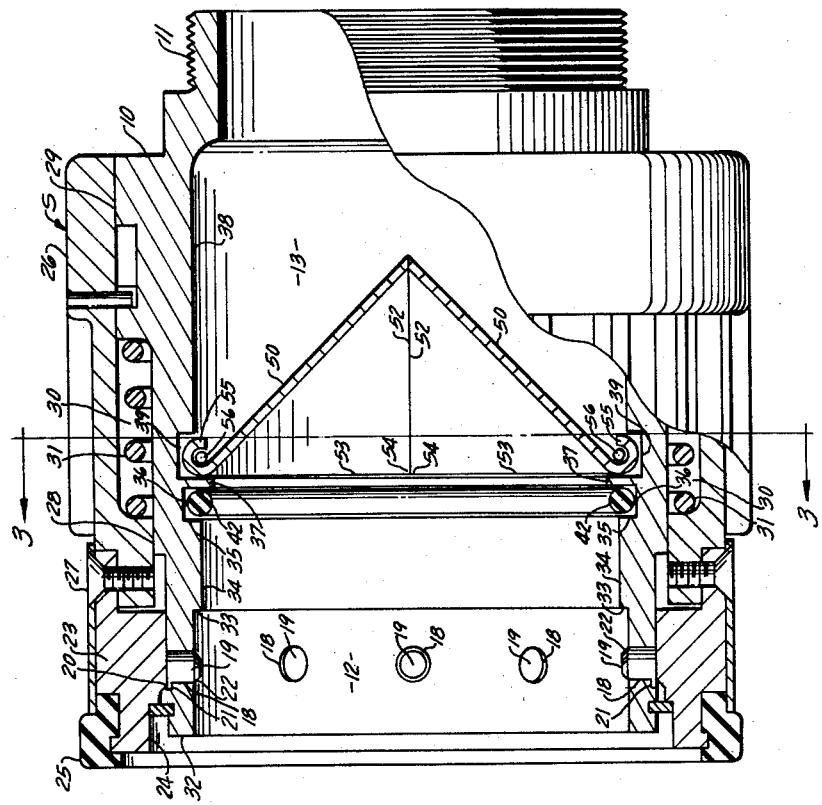
Fig. 1
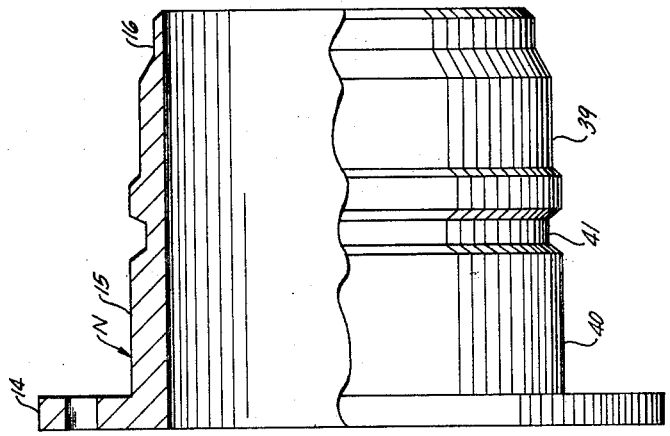
INVENTOR.
ROLLAND W. COLLAR
BY Bosworth, Sessions,
Herrstrom & Knowles
ATTORNEYS March 31, 1964     R. W. COLLAR     3,127,148
VALVED COUPLING Filed March 14, 1962     2 Sheets-Sheet 2

INVENTOR.
ROLLAND W. COLLAR
BY Bosworth, Sessions,
Herrnthorn & Krookes
ATTORNEYS

United States Patent Office

3,127,148
Patented Mar. 31, 1964

3,127,148
VALVED COUPLING
Rolland W. Collar, Sun Valley, Calif., assignor to Lear Siegler, Inc., a corporation of Delaware
Filed Mar. 14, 1962, Ser. No. 179,554
2 Claims. (Cl. 251—149.2)

This invention relates to valved couplings and in particular to a two-part valved coupling for coupling pneumatic hoses or lines and in which the female or socket coupling part has valving means for permitting substantially unrestricted flow through the coupled parts and for restricting flow from the end of the hose or line with which it is associated when the socket part is disconnected from its mating male or nipple part. Such valved couplings find utility, for example, in connection with ground support equipment systems adapted to supply air for starting jet aircraft and for missile support systems.

A conventional method for ground starting of a jet aircraft engine consists of furnishing substantial volumes of air at a relatively high pressure and temperature to a turbine starter mounted on the engine and adapted to drive the engine and to bring it up to speed necessary for lighting the engine. The air is conventionally supplied through an air input nipple fitting accessible from the exterior of the shrouded or cowled engine.

Air at appreciable pressures and temperatures for driving the starter turbine is provided by ground units such as portable gas turbines whose exhaust gases provide substantial volumes of heated air, portable supplies of compressed gases and motor driven industrial compressors. The air from any one of such possible sources or other sources is carried to the jet engine through convenient lengths of flexible hose. The hose is connected to the exteriorly accessible intake nipple on the jet engine by means of a socket or female coupling part adapted to receive and connect in locked engagement with the nipple and to be disconnected from the nipple when the jet engine is started. Because the hose is being supplied with large volumes of air, it has a tendency to whip and move about when the socket at its end is disconnected from the air intake nipple on the jet engine if the flow of air through the hose is not restricted in some way. The whipping hose, driven by a powerful discharge of air from its disconnected end, is a difficult and indeed hazardous piece of equipment for ground crews to handle.

One of the objects of this invention, therefore, is to provide a coupling having valve means which restricts the flow of gaseous fluid from the coupling socket end of the supply hose when the socket is separated from the coupling nipple. A further object is to provide such a valved coupling in which the valve means forms a substantially straight-through passage within the coupling and permits an unobstructed flow path for gaseous fluid passing therethrough when the coupling parts are connected together. Another object of this invention is to provide a coupling having valve means which automatically reacts to restrict flow from the socket end of the hose upon disconnection of the two coupling parts and to permit substantially unrestricted flow through the coupling and hose when the two parts of the coupling are brought together. A further object of this invention is to provide such a coupling that is simple and contains a minimum number of parts consistent with reliability and is easy to assemble and disassemble by service maintenance personnel having only a minimum of training. Still another object is to provide a valved coupling which does not require any significant increase in the overall diameter of the coupling to accommodate the valve means.

Briefly, my invention consists of a coupling in which the socket or female portion is provided with a plurality of valve elements mounted in and adapted to lie against and to conform substantially to its internal bore. The elements are hinged to the internal wall of the socket at their downstream ends and are urged by spring means to swing into the flow path through the coupling so that their upstream peripheral edge portions meet together in a modified ellipsoidal formation pointing upstream of and substantially restricting the flow through the coupling. When the socket or female portion is connected in locked engagement with the nipple or male portion of the coupling, the valve elements are engaged by the nose portion of the nipple and are held back against the internal wall of the socket portion of the coupling substantially out of the flow path, thus permitting substantially unrestricted flow through the coupling. When the coupling is disconnected and the nipple withdrawn from the socket, the valve elements are urged to and maintained in a flow-restricting position within the socket portion of the coupling by spring means and by pneumatic pressure in the hose and socket portion of the coupling.

One form which the invention may assume is described below and illustrated in the accompanying drawings in which:

FIGURE 1 is a side elevation, partly in section, of a preferred form of valved coupling embodying my invention and showing the socket disconnected from the nipple and the valve means in its flow-restricting position within the socket;

Figure 2:
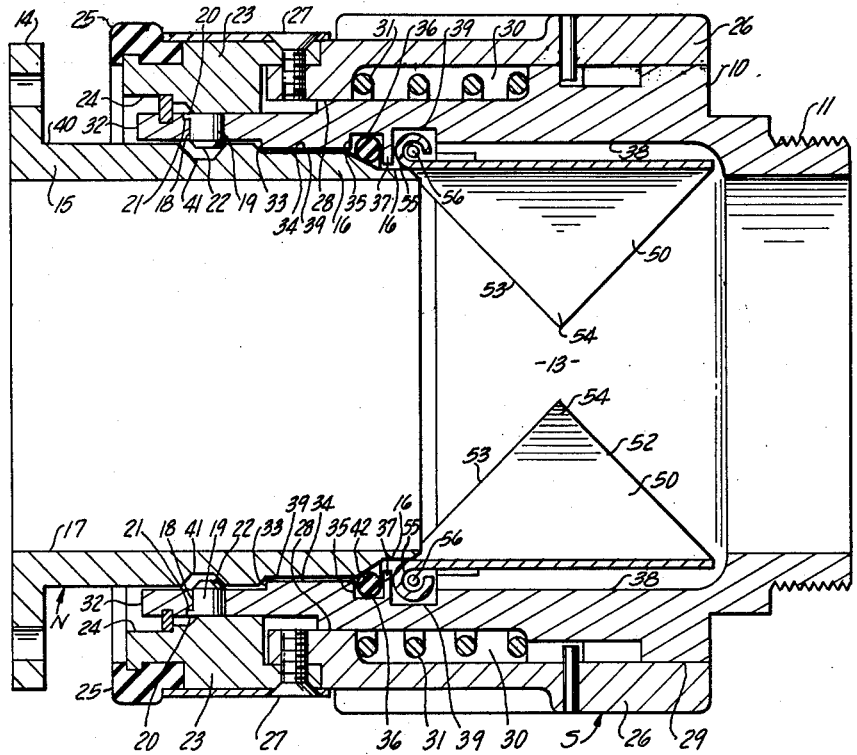
FIGURE 2 is an axial section of the coupling of FIGURE 1 shown in the connected position and with the valve means open to permit flow through the coupling.

As shown in the drawings, the two-part coupling is made up of a valved socket member indicated in general at S and a nipple member indicated in general at N. Socket member S comprises a generally cylindrical body 10 having conventional means such as external threads 11 at one end for securing the member to a fluid conduit or the like and having a nipple receiving portion 12 at the other end. A valve chamber 13 occupies the approximate midsection of socket S and lies between threaded portion 11 and nipple receiving portion 12. The internal bore of body 10 is made up of circular portions of different diameters as appears more fully below.

As seen in FIGURE 1, nipple member N is a simple unitary fitting of generally cylindrical configuration having a mounting flange 14 at one end, a generally cylindrical midsection 15 and a nose portion 16 at its opposite end. The nipple member is provided with a smooth axially aligned bore 17.

Any suitable means for detachably locking socket member S and nipple member N in coupling engagement with each other may be employed. In the coupling illustrated, nipple receiving portion 12 of body 10 is provided with a series of circumferentially spaced radial openings 18 in which are disposed radially movable locking pins 19. The openings 18 and pins 19 are generally circular in cross section but may be provided with corresponding mating flat surfaces extending axially of them so that the pins are held against rotation when they are disposed in the openings 18. The head of each pin 19 is provided with a radially projecting lip 20 which limits the inward movement of the pins into the bore of body member 10 and prevents loss of the pins. The outer ends of openings 18 are counterbored as at 21 to receive the projecting lips 20. The inner ends of each pin 19 are preferably provided with an annular bevel 22.

In order to cam locking pins 19 inwardly and hold them in a locking position as shown in FIGURES 1 and 2, as well as to permit them to move outwardly to an unlocking position, body member 10 carries on its exterior a locking or camming ring 23. Camming ring 23 is mounted for limited axial sliding on body member 10 in the region of openings 19 thereon and is provided with an enlarged bore 24 facing the nipple receiving end of socket member S. The same end of camming ring 23 may usefully be provided with a rubber bumper 25 held in place thereon in any suitable manner.

An actuating sleeve 26 is mounted for limited axial sliding movement on and around midsection 13 of body member 10 and is connected to camming ring 23 by machine screws 27 so that camming ring 23 and actuating sleeve 26 slide back and forth on body member 10 as a unit. One end of actuating sleeve 26 has a reduced bore engaging the exterior of body member 10 as at 28 and the bore of the other end of actuating sleeve 26 engages body member 10 along an exterior surface of enlarged circular cross section as at 29. Between reduced portion 28 of actuating sleeve 26 and enlarged portion 29 of body member 10 is formed an annular chamber 30 in which is disposed a compression spring 31 surrounding body member 10 and acting between reduced portion 28 and enlarged portion 29 of the sleeve and body member, respectively. Spring 31 tends to urge camming ring 23 and actuating sleeve 26 toward the nipple-receiving end of socket member S and to lock and hold pins 19 in their inward position as shown in FIGURES 1 and 2. Movement of camming ring 23 and actuating sleeve 26 against the force of compression spring 31 brings enlarged bore 24 of camming ring 23 over the heads of pins 19 permitting them to be retracted from their position of extension within the bore of body 10.

The internal bore of body member 10 extends inwardly from the nipple receiving end at a uniform diameter to a point beyond the series of openings 18 where it is joined by a shallow radial shoulder 33 to an axially extending portion 34 of reduced diameter. Bore portion 34 provides a guiding and aligning surface for nipple member N of a diameter approximately the same as the distance between ends of each diametrically opposite pair of pins 19 when in their inward locking position. Portion 34 terminates in an outwardly extending shoulder 35 forming one side of an O-ring groove 36. The other side of O-ring groove 36 is formed by a relatively thin-walled flange 37 extending radially inward to a somewhat lesser diameter than that of portion 34 of the bore.

Section 13 of body member 10 containing the valving means and lying between annular internal flange 37 and threaded portion 11 is provided with a somewhat enlarged bore 38 which has a greater diameter than both the flange 37 and the bore of threaded portion 11 and includes an annular groove 39 adjacent annular flange 37. The nature and requirements of the valving portion of body member 10 are described more fully below in connection with the description of the valving means itself.

The external surface of nipple member N is comprised of axial portions of varying diameters beginning with nose portion 16 which is of a diameter only slightly less than the inside diameter of flange 37 of body member 10 in the socket. Next to the nose portion 16 is the guiding and aligning portion 39 of greater outside diameter than nose portion 16 and adapted to slide within the guiding and aligning portion 34 of the socket. The remaining portion 40 of the outer cylindrical surface of nipple member N has an outside diameter adapted to be received in section 12 of body member 10 of the socket and is provided at the appropriate point along its axial length with an annular groove 41 which, when placed opposite opening 18 in the internal bore of body member 10, permits the movement for locking pins 19 into locking engagement therewith for holding nipple portion N locked within socket member S as shown in FIGURE 2.

All of the outer cylindrical surfaces of nipple N, including the bottom of groove 41, are joined together by appropriately inclined radial surfaces designed to facilitate the smooth entry of nipple member N into socket member S and to provide the necessary camming action for retracting pins 19 during the entry of nipple N into the socket and until radial alignment with groove 41 in nipple N.

The complementary relationship of the various diameters of the bore of socket S and the external surface of nipple N can be seen in FIGURE 2 showing the two-part coupling in a condition of coupled and locked engagement. Nose portion 16 of nipple N lies axially inwardly of radial flange 37 in cooperating contact with the valving means as will be described more fully below. The guiding and aligning portions 34 and 39 of the bore and the exterior of the socket and nipple, respectively, lie in matched engagement. The inclined shoulder connecting guiding and aligning surface 39 of the nipple with nose portion 16 is in sealing engagement with O-ring 42 in groove 36 of socket S. The inner beveled end of the pins 19 bear against the inclined forward side wall of groove 41 of nipple N and with camming ring 23 of socket S in the position shown in FIGURE 2 lock together and prevent the separation of nipple N and socket S.

The particular means for locking and unlocking the two parts of the coupling together as shown in the accompanying drawings and as described above operates as follows: In order to effect a connection of the two parts of the coupling when separated as shown in FIGURE 1, actuating sleeve 26 and camming ring 23 are drawn away from the nipple receiving end of socket S, bringing the enlarged bore 24 of camming ring 23 opposite the head of locking pins 19 to provide free room for their movement radially out of the bore of socket S. Next, socket S and nipple N are brought together and the nose portion 16 introduced into the end of socket S. As the two parts slide together, the sloping shoulder immediately preceding groove 41 in nipple N cams the locking pins 19 radially outwardly permitting the two coupling parts to telescope together until the inclined shoulder between nose portion 16 and guiding and aligning portion 39 of nipple N engages and begins to compress O-ring 42 carried in socket S. At this point, actuating sleeve 26 is released and is driven toward the nipple receiving end of socket S by compression spring 31. The camming ring moves locking pins 19 into engagement with groove 41 of nipple N and holds them in that position thereby locking the two parts of the coupling together.

To separate the two parts of the coupling, actuating sleeve 26, together with camming ring 23, are retracted against compression spring 31 giving room above the ends of locking pins 19 as the enlarged bore 24 of camming ring 23 comes into radial relationship with the pins. Nipple N is then withdrawn and locking pins 19 are cammed out of the way by the inclined side wall of groove 41 in nipple N. Upon withdrawal of nipple N from socket S, actuating sleeve 26 is released and the socket and its parts assume the position shown in FIGURE 1.

Figure 3:
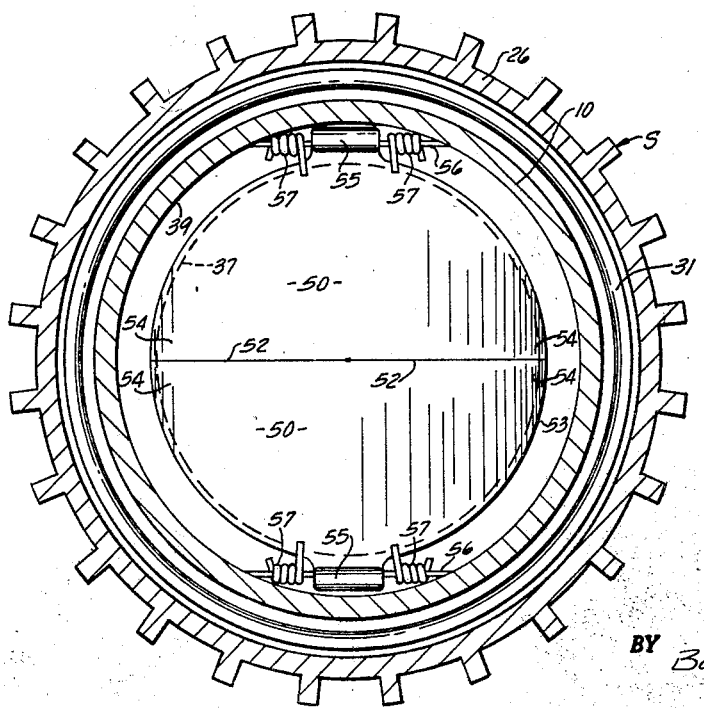
FIGURE 3 is a transverse cross section taken along the line 3—3 of the valved socket part of the coupling shown in FIGURE 1.

As seen in the closed position in FIGURES 1 and 3 and in the open position in FIGURE 2, the valving means in the two-part coupling comprises at least two concavo-convex, petal-shaped elements 50, each comprising a portion of a cylindrical surface. Each element is bounded by an upstream edge 52 and a downstream edge 53 of elliptical form which meet together on opposite sides of each element at substantially right angles as indicated at 54.

Each of the elements 50 is hinged at substantially the midpoint of its downstream edge 53 to body member 10 at annular groove 39. With the elements 50 hinged in such a manner and being of the shape described above, they may lie back against and substantially conform to the enlarged bore portion 38 in body member 10. Enlarged bore portion 38 is preferably substantially coextensive with the extreme axial dimension of the elements 50 when the elements are lying next to the bore and in the position shown in FIGURE 2.

The hinged connection of each of the elements 50 with body member 10 permits them to swing inwardly into the flow path within socket S until they come together in substantially the center of the bore with their upstream edges 52 in substantial matching engagement with each other and their downstream edges 53 in engagement with and resting against the upstream side of radial flange 37. Radial flange 37 positively limits the swing of each of the elements into the flow path in the event of the misalignment of mating upstream edges 52 or if one of the elements 50 should swing into the flow path substantially ahead of or before the other of the elements 50.

The hinged means for connecting each element 50 to the internal bore of body member 10 is preferably provided by a rolled and turned tab 55 projecting from the midpoint of its downstream side 53 as seen in cross section in FIGURES 1 and 2 and in elevation in FIGURE 3. The tabs 55 thus rolled are adapted to receive a hinge pin 56 lying along a chord of an arc of annular groove 39 and held in place at either end by insertion into a drilled hole in the bottom of groove 39. As shown in FIGURE 3, each element 50 and associated hinge pin 56 is provided with spring means such as springs 57 carried on pin 56 and acting between the element 50 and the bottom wall of groove 36 so as to urge the element 50 to swing outwardly away from the bore of body member 10 and into the flow path through the socket member S. Thus, when the two parts of the coupling are separated and disconnected, the elements 50 swing together and meet in the midstream of the flow path through the socket portion S substantially restricting the flow of air, for example, therethrough.

When the two parts of the coupling are connected and locked together as shown in FIGURE 2, nose portion 16 of nipple N enters and extends beyond radial flange 37 into body member 10 and engages each element 50 along a line a short distance away from the axis of its hinge. When the nipple portion has reached the locking position within socket S, nose portion 16 of nipple N projects far enough into the socket and to a point substantially radially opposite the axis of the hinge pins 56 so as to push back and hold each of the elements 50 in their open position within the enlarged bore portion 38 as shown in FIGURE 2. The enlargement 38 of the bore bore of body member 10 permits the valving elements 50 to be retracted substantially out of the main flow path through the coupling as defined by the internal bore 17 of nipple N and the internal bore of the threaded portion 11 of body member 10 of socket S. This has the advantage of minimizing the pressure drop through the coupling due to the valve means and further shields the retracted and opened elements 50 from the velocity forces of the flow through the coupling, which would otherwise tend to swing the elements 50 into the bore and into their flow-restricting position.

Upon withdrawal of the nipple N from the socket portion S, nose portion 16 is separated from engagement with the elements 50. They are initially urged by their closing springs 57 into the air stream which aids the springs 57 in swinging the elements 50 to their closed position with their downstream edges 53 in engagement with annular flange 37 and their upstream edges 52 in mating engagement.

It will be seen that the elements 50 comprise clam shell type valve means adapted automatically to close and substantially restrict flow from socket S when disengaged from nipple N but which are opened to a position permitting substantially unrestricted flow through the coupling when nipple N and socket S are in locked engagement with each other.

While I prefere to employ a pair of valve elements 50, my invention comprehends a greater number of such elements suitably shaped so as to swing back and against and substantially conform to the enlarged bore of the body member of the socket and also adapted to mate together to form an upstream-pointing ellipsoidal wall for substantially restricting the flow of fluid through socket S.

Any suitable material may be employed for making the various parts of the coupling embodying my invention, keeping in mind the temperatures, pressures and other stresses imposed upon the valved coupling in its intended use. The locking pins shown and disclosed herein have successfully been used in connection with the valving arrangement of my invention though the invention is not limited to the particular locking means herein shown.

Those skilled in the art will appreciate that various changes and modifications can be made in the apparatus described herein without departing from the spirit and scope of the invention.

I claim:

1. A valved coupling for pneumatic lines having separable nipple and socket portions each having an aligned bore therethrough, said nipple having a cylindrical nose portion terminating in a plane perpendicular to the axis of the bore, said socket portion adapted to receive and connect with the nipple portion, said socket portion having a length of enlarged bore and swinging clam shell type valving means mounted therein for permitting substantially full flow through the socket when the coupling is connected and for restricting flow through the socket when the coupling is disconnected, said valving means comprising a pair of concavo-convex, petal-shaped elements generated from a cylindrical surface, each of said elements bounded by an upstream and a downstream arcuate edge which meet together at their ends, spring biased hinge means connecting the midpoint of the downstream edge of each of said elements to diametrically opposite portions of the bore of the socket including a hinge pin lying along a chord of an arc of the socket bore and in a plane perpendicular to the bore axis at the downstream end portion of the length of enlarged bore and within reach of the nose of the nipple portion for swinging movement of the elements toward and away from the enlarged bore surface, a radially inwardly extending annular shoulder in the bore of the socket adjacent the downstream side of said hinge means, said elements upon connection of and axial alignment of the bores of the socket and nipple and at all positions of relative rotational alignment of the socket and nipple being engaged by the nose of the nipple reaching into the socket at least almost to the plane of the hinge pins and urged to lie along and around the enlarged bore surface and entirely within the bore enlargement and radially outside the diameter of the bore upstream of the bore enlargement whereby the elements permit substantially full flow through the bore of the socket and upon separation of the socket and nipple being spring urged together with the upstream edges in approximately matching engagement throughout their lengths and the downstream edges in approximately matching engagement at their ends and together substantially comprising a circle in abutting engagement with the annular shoulder whereby the elements substantially fill and restrict fluid flow through the socket.

2. A valved coupling for pneumatic lines having separable nipple and socket portions each having an aligned bore therethrough, said nipple having a cylindrical nose portion terminating in a plane perpendicular to the axis of the bore, said socket portion adapted to receive and connect with the nipple portion, and swinging clam shell type valving means within the socket portion adapted to be open when the coupling is connected for permitting substantially full flow through the socket and adapted to be closed when the two parts of the coupling are saparated for restricting flow through the socket, said valving means comprising a plurality of concavo-convex, petal-shaped elements circumferentially spaced around the bore of the socket, each of said elements being generated from a cylindrical surface and bounded by an upstream and a downstream arcuate edge which meet together at their ends, spring biased hinge means connecting a point on the downstream edge of each of said elements to the bore of the socket and located to position said elements within reach of the nose of the nipple portion for swinging movement of the elements toward and away from the bore surface, said elements upon connection of and axial alignment of the bores of the socket and nipple and at all positions of relative rotational alignment of the socket and the nipple being engaged by the nose of the nipple and urged to lie along and around the bore surface whereby the elements permit substantially full flow through the bore of the socket and upon separation of the socket and nipple being spring urged together with their upstream edges in approximately matching engagement throughout their lengths and the downstream edges in approximately matching engagement at their ends and together substantially comprising a circle whereby the elements substantially fill and restrict fluid flow through the bore of the socket.

References Cited in the file of this patent

UNITED STATES PATENTS

| | | |
|---|---|---|
| 132,617 | Allen | Oct. 29, 1872 |
| 586,618 | Noll | July 20, 1897 |
| 2,406,662 | Burchett | Aug. 27, 1946 |
| 3,016,914 | Keithahn | Jan. 16, 1962 |